(No Model.)
I. L. LANDIS.
Gate.
No. 238,924. Patented March 15, 1881.
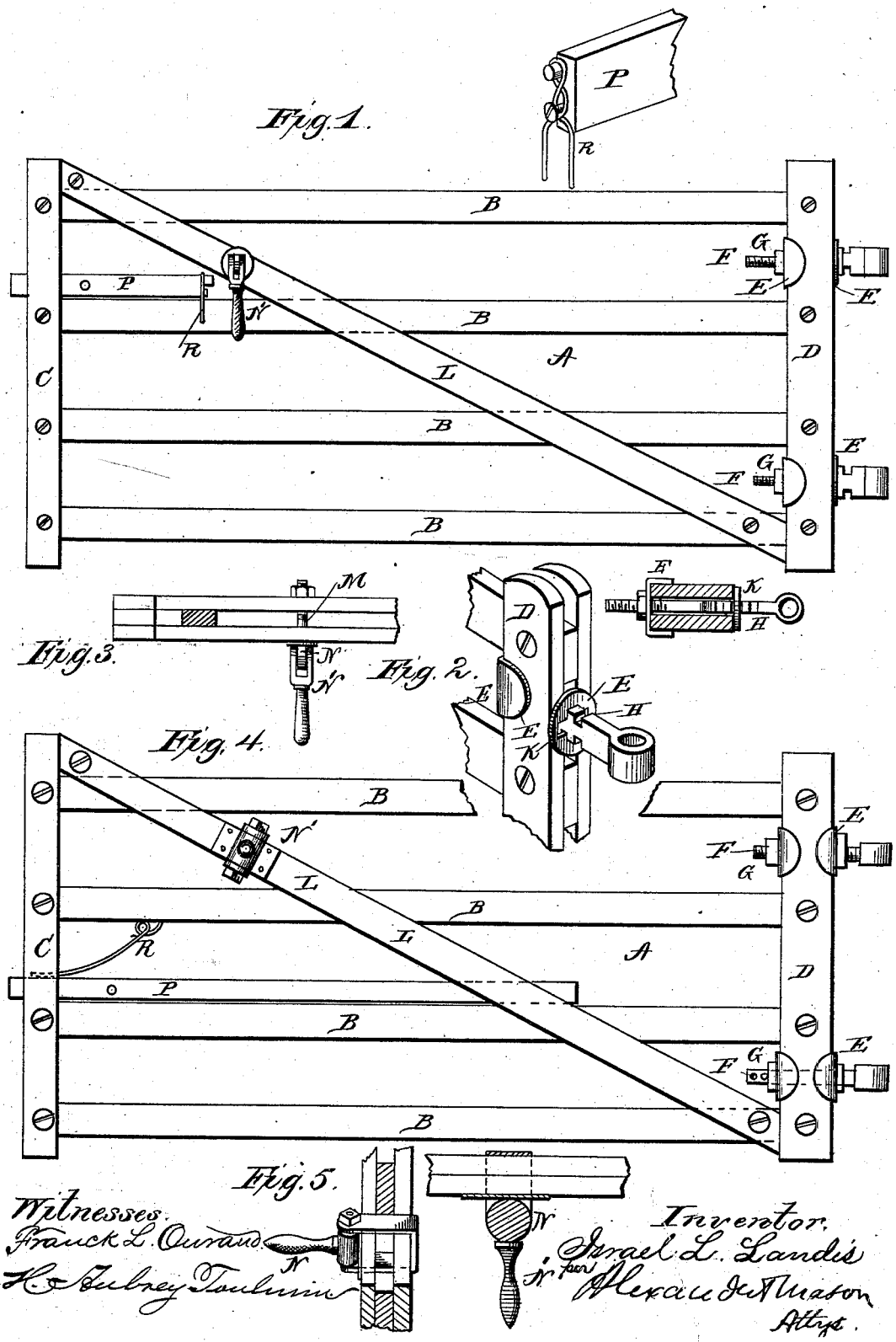

UNITED STATES PATENT OFFICE.

ISRAEL L. LANDIS, OF LANCASTER, PENNSYLVANIA.

GATE.

SPECIFICATION forming part of Letters Patent No. 238,924, dated March 15, 1881.

Application filed January 18, 1881. (No model.)

*To all whom it may concern:*

Be it known that I, ISRAEL L. LANDIS, of Lancaster, in the county of Lancaster, and in the State of Pennsylvania, have invented certain new and useful Improvements in Gates; and I do hereby declare that the following is a full, clear, and exact description thereof, reference being had to the accompanying drawings, and to the letters of reference marked thereon, making a part of this specification.

This invention relates to certain improvements in farm-gates; and it has for its objects to provide a gate having vertically and lontudinally adjustable connections, by means of which it can be secured to the pintles of an ordinary gate-post, in whatever position they may be located with respect to each other, and by means of which the gate may be adjusted as required to compensate for sagging, as more fully hereinafter specified.

My invention further has for its object to provide a means whereby the gate may be elevated at its free end so as to clear obstructions, such as snow and ice, or to permit small animals to pass under it, and to hold it in such elevated position, and also to provide a means for holding the bolt of the latch and prevent it from falling back out of place when the gate is elevated, as more fully hereinafter specified.

These objects I attain by the devices illustrated in the accompanying drawings, in which—

Figure 1 represents a side elevation of my improved gate, showing the same in the position it assumes when closed. Fig. 2 represents a detached perspective view of the rear battens of the gate, showing the method of attachment of the connections to secure the gate to the pintles. Fig. 3 represents a detached view, showing the means of clamping the gate-bars in position when the gate is elevated. Fig. 4 represents a side elevation of the gate complete; and Fig. 5 represents detached views, showing a modification of the mechanism for clamping the bars in position.

The letter A indicates the gate, which is constructed of a series of parallel bars, B, pivoted at each end between the vertical battens C and D, in such manner that the bars may be moved after the manner of a parallel ruler.

Between the rear parallel battens are secured the adjustable clips E which carry the screw-bolts F, provided with eyes at the rear ends, and nuts G at their forward ends, by means of which nuts the said bolts may be caused to clamp the clips in any desired position vertically between the battens, so as to adapt the bolts to set over the pintles of an ordinary gate-post in whatever relative positions they may be located. The bolts are provided with recesses H, which are adapted to engage the edges of the slot K in the rear clip, so that the said bolts may be adjusted longitudinally with respect to the gate to adjust the gate and compensate for sagging.

The letter L indicates two diagonal bars, pivoted at opposite ends to the upper and lower parallel bars of the gate, and embracing the bars on opposite sides. Through said diagonal bars is passed a screw-bolt, M, carrying a cam and lever, N N', at one end, by means of which said diagonal bars may be clamped upon the parallel bars to hold them in position.

In the modification shown in Figs. 4 and 5 a strap is passed around the diagonal bars, to which the cam or eccentric is pivoted, in such manner that it can be brought to bear against one of the diagonal bars, so as to clamp the two against the parallel bars.

The letter P indicates the latch-bolt, which is adapted to slide back and forth on one of the parallel bars to latch and unlatch the gate. The said bolt is provided with a spring, R, which by frictional contact prevents the bolt from falling back when the gate is elevated.

Having thus described my invention, what I claim, and desire to secure by Letters Patent, is—

1. In combination with the parallel bars and side battens, the adjustable clips and bolts, the latter being provided with recesses on their edges, and adapted to engage the edges of the slots in the rear clip, and with eyes to set upon the pintles of the gate-post, whereby the bolts may be adjusted longitudinally or vertically, substantially as and for the purposes specified.

2. In combination with the parallel bars and the battens of the gate, the diagonal bars, the bolt passing through said bars, and the cam and lever carried by the bolt for clamping and holding the parallel bars in position, substantially as set forth.

3. In combination with the parallel bars of the gate, the sliding latch-bolt and friction-spring, arranged to bear upon and hold the latch-bolt in position when the gate is elevated, substantially as specified.

In testimony that I claim the foregoing I have hereunto set my hand this 17th day of January, 1881.

ISRAEL L. LANDIS.

Witnesses:
H. AUBREY TOULMIN,
C. A. NEALE.